United States Patent [19]

Milliken, Jr.

[11] 4,204,383

[45] May 27, 1980

[54] AUTOMATIC HEIGHT CONTROL FOR GATHERING REEL FOR AGRICULTURAL COMBINE

[75] Inventor: James W. Milliken, Jr., Independence, Mo.

[73] Assignee: Allis-Chalmers Corporation, Milwaukee, Wis.

[21] Appl. No.: 920,193

[22] Filed: Jun. 29, 1978

[51] Int. Cl.² ............................................. A01D 67/00
[52] U.S. Cl. ............................... 56/10.2; 56/DIG. 15
[58] Field of Search ............... 56/10.2, 10.4, DIG. 15, 56/208

[56] References Cited

U.S. PATENT DOCUMENTS

| | | | |
|---|---|---|---|
| 2,750,727 | 6/1956 | Wright | 56/DIG. 15 |
| 3,196,599 | 7/1965 | Meiners | 56/208 |
| 3,383,845 | 5/1968 | Hirsch et al. | 56/DIG. 15 |
| 3,417,553 | 12/1968 | Hubbard | 56/208 |
| 3,597,907 | 8/1971 | Neal | 56/208 |
| 3,623,301 | 11/1971 | Hofer | 56/10.4 |
| 3,698,164 | 10/1972 | Boone et al. | 56/10.4 |
| 3,747,311 | 7/1973 | DeCoene et al. | 56/208 |
| 3,886,718 | 6/1975 | Talbot | 56/10.2 |
| 4,124,970 | 11/1978 | Bernhardt | 56/10.2 |

Primary Examiner—Louis G. Mancene
Assistant Examiner—Paul J. Hirsch
Attorney, Agent, or Firm—Robert C. Sullivan

[57] ABSTRACT

An automatic height control for a gathering reel used with an agricultural combine of the type in which a floating cutter assembly and a gathering reel are carried by the header of the combine forwardly of the header. The control system of the invention adjusts the height of the gathering reel in closely tracking relation with vertical movement of the floating cutter assembly to thereby avoid damage to the gathering reel and to the cutter assembly due to interference between the cutter assembly and the gathering reel. The control system of the invention may be used in conjunction with a prior art header height control arrangement which responds to a predetermined vertical movement of the floating cutter assembly to vertically adjust the header and thus to vertically adjust the gathering reel carried by the header. However, the automatic height control of the invention requires a smaller increment of vertical movement of the cutter assembly for initiation of the gathering reel height adjustment than is required by the prior art header height control. The close tracking relation of the vertical position of the gathering reel relative to the vertical position of the cutter assembly provided by the control arrangement of the present invention permits location of the gathering reel closer to the cutter assembly and to the crop inlet end of the header, and in an optimum position for most effectively gathering the crop for cutting and for depositing the cut crop in the header of the combine.

15 Claims, 4 Drawing Figures

Fig. 4

AUTOMATIC HEIGHT CONTROL FOR GATHERING REEL FOR AGRICULTURAL COMBINE

TECHNICAL FIELD

This invention relates to agricultural combines and more particularly to an agricultural combine having a floating cutter assembly and a gathering reel both carried by the header of the combine and further including an automatic control arrangement which causes the gathering reel to move vertically in closely tracking relation to the vertical movement of the floating cutter assembly. This closely tracking relation of the vertical position of the gathering reel relative to the vertical position of the floating cutter assembly avoids damage to the gathering reel and to the cutter assembly due to interference between the cutter assembly and the gathering reel during floating vertical movement of the cutter assembly caused by undulations in the terrain and/or by obstacles in the path of the cutter assembly. The automatic gathering reel height control arrangement of the invention is an improvement on and may be used in conjunction with and in addition to the prior art automatic header height adjustment provided on agricultural combines as shown by U.S. Pat. No. 3,698,164 of Jerry C. Boone et al which adjusts the height of the header (and consequently adjusts the height of the gathering reel carried by the header) in response to a vertical movement of the floating cutter assembly relative to the header of more than a predetermined amount from the normal median vertical position of the floating cutter assembly relative to the header. The automatic control arrangement of the invention permits the gathering reel to be located in an optimum position relative to the header and to the floating cutter assembly for most effectively gathering the crop for cutting and for depositing the cut crop in the header of the combine for conveying to the thresher of the combine.

BACKGROUND OF PRIOR ART

It is known in the prior art to mount a floating-type cutter assembly of the type shown by the aforementioned U.S. Pat. No. 3,698,164 of Jerry C. Boone et al on the header of an agricultural combine, and to have such a floating-type cutter assembly cooperate with a gathering reel positioned forwardly of the cutter assembly. Floating cutter assemblies are usually employed in connection with the harvesting of crops wherein the seed bearing portions are normally close to the ground, such as soybeans, lespedeza or the like, in which the stalk must be cut close to the ground, or in connection with the harvesting of grains and other seed crops which have been beaten down by a storm (i.e., "down" crops) so that their seed bearing heads are lying close to the ground. The floating cutter assembly is adapted to "float" or change its vertical position in accordance with changes in the contour of the terrain over which the combine is moving, the floating cutter assembly following the undulations of the terrain, and also passing over any obstructions in its path, whereby to cut the stems of the soybean crop or the like at a substantially uniform level close to the ground, regardless of variations in the contour of the terrain such as undulations in the terrain traversed by the combine.

In most cases, agricultural combines having floating cutter assemblies mounted on the header of the combine are provided with gathering reels of the well-known "finger" (or "tine") type since the fingers or tines carried by this type of gathering reel are adapted to lift the crop such as soybeans, for example, or alternatively to lift a "down" crop of grain or the like which has been beaten down by a storm up into vertical position to facilitate cutting of the crop by the cutting elements of the floating cutter assembly. The tines of the tine-type gathering reel also serve to deposit the cut crop into the crop inlet end of the header, where the cut crop is conveyed to the thresher.

As shown by the aforementioned U.S. Pat. No. 3,698,164 of Jerry C. Boone et al agricultural combines having floating cutter assemblies have been provided with means for automatically adjusting the height of the header of the combine in response to a sensed departure of the vertical position of the floating cutter assembly relative to the header by more than a predetermined amount from the normal median vertical position of the floating cutter assembly relative to the header. Any change in the height of the header provided by the prior art automatic header height control just mentioned imparts a similar vertical adjusting movement to the gathering reel, since the gathering reel is mounted on and carried by the header. This prior art automatic header height control provides what may be referred to as a "gross" or coarse tracking relation of the vertical position of the gathering reel relative to the vertical position of the floating cutter assembly.

However, due to the "gross" or coarse tracking relation of the vertical position of the gathering reel relative to the vertical position of the floating cutter assembly provided by the prior art automatic header height control just mentioned, it has been necessary in the prior art to position the gathering reel above or alternatively ahead of the range of travel of the floating cutter assembly in order to avoid interference between the floating cutter assembly and the gathering reel. If the gathering reel were not placed out of the path of vertical travel of the floating cutter assembly as just mentioned, the floating cutter assembly in its upward movement could cut off the ends of the tines of the gathering reel, thereby causing damage not only to the gathering reel, but also very possibly causing damage to the sickle guards and cooperating reciprocating sickle forming part of the floating cutter assembly. Therefore, in the prior art relating to combines having a floating cutter assembly, the gathering reel carried by the header of the combine has been so positioned forwardly of the floating cutter assembly that the tines of the gathering reel and the components of the floating cutter assembly which provide the crop cutting action (i.e., the reciprocating sickle and the cooperating stationary sickle guards) do not contact each other at any time during the harvesting operation.

However, there is a considerable operating disadvantage to the prior art arrangement just briefly described in which the gathering reel is positioned outside of the range of travel of the floating cutter assembly, since this prior art location of the gathering reel away from the floating cutter assembly greatly reduces the effectiveness of the gathering reel to gather up the crop for cutting and for then depositing the cut crop into the header for conveying to the thresher. In the prior art location of the gathering reel away from the floating cutter assembly and thus further away from the opening of the header into which the cut crop is supposed to be deposited by the tines of the gathering reel, the gathering reel tines deposit the crop on top of the cutter bar and shields associated with the cutter bar structure instead of depositing the cut crop close enough to the header opening so that the momentum imparted to the crop by the reel tines will carry it on into the header. In the prior art arrangement, as more crop is cut and dropped onto the cutter bar, the cut crop starts to bunch and moves forward toward the gathering reel. The movement along the field of the combine crowds more and more cut crop into the bunch and then, due to the crowding of the cut crop, the cut crop moves up the shields and into the header, causing grain loss due to shatter (i.e., premature separation of the grain from the grain head) and undesirable simulated threshing, both resulting from the bunches of the cut crop being knocked back toward the header by the tines of the gathering reel.

The following United States patents are examples of prior art patents showing an agricultural combine having means for adjusting the vertical height of the header and of a gathering reel carried by and movable with the header:

| Patent No. | Name | Date |
| --- | --- | --- |
| 3,137,984 | Shonkwiler | June, 1964 |
| 3,228,178 | Shonkwiler | January, 1966 |
| 3,286,448 | Moore | November, 1966 |
| 3,312,048 | Annat et al | April, 1967 |
| 3,383,845 | Hirsch et al | May, 1968 |
| 3,417,555 | Watkins et al | December, 1968 |
| 3,568,420 | Hofer et al | March, 1971 |
| 3,574,990 | Calder | April, 1971 |
| 3,717,983 | Reitz et al | February, 1973 |
| 3,747,311 | DeCoene et al | July, 1973 |

BRIEF SUMMARY OF THE INVENTION

Accordingly, it is an object of the present invention to provide in combination with an agricultural combine having a floating cutter assembly and an associated gathering reel, both carried by the header of the combine, an automatic height control arrangement for the gathering reel which adjusts the vertical position of the gathering reel in closely tracking relation to the vertical position of the floating cutter assembly, whereby to avoid damage to either the gathering reel or to the floating cutter assembly which would otherwise be caused by interference between these members if the floating cutter assembly in its vertical movement were to move into the path of movement of the gathering reel.

It is another object of the invention to provide for use with and in combination with an agricultural combine having a floating cutter assembly and a gathering reel positioned forwardly of the floating cutter assembly relative to the direction of movement of the combine, an automatic height control for the gathering reel in which the vertical position of the gathering reel is adjusted in closely tracking relation with the vertical movement of the associated floating cutter assembly, whereby to permit location of the gathering reel in an optimum position for gathering the crop for cutting and for then depositing the cut crop in the crop inlet opening of the header of the combine for conveying to the thresher of the combine.

It is still another object of the invention to provide for use with and in combination with an agricultural combine having a floating cutter assembly and an associated gathering reel both carried by the header of the combine, and in which the combine also includes means for adjusting the header height in response to a predetermined vertical movement of the floating cutter assembly, whereby to also thereby provide a coarse adjustment of the height of the gathering reel carried by the header, the improvement which comprises means for adjusting the vertical height of the gathering reel in closely tracking relation with vertical movement of the floating cutter assembly and which requires a substantially smaller vertical movement of the floating cutter assembly to initiate an adjustment in the vertical height of the gathering reel than that required for actuation of the prior art automatic header height control, thus providing a closer tracking relation of the vertical position of the gathering reel relative to the vertical position of the floating cutter bar assembly than is provided by the prior art header height control.

It is a further object of the invention to provide in an agricultural combine a cooperative and positional relationship between a floating cutter assembly and an associated gathering reel which greatly increases the effectiveness of the gathering reel in depositing the cut crop into the crop inlet opening of the header of the combine, whereby to greatly reduce grain loss due to shatter and due to simulated threshing which were frequently characteristic of prior art arrangements in which the gathering reel was positioned outside of the range of travel of the floating cutter assembly to avoid damaging the reel and the floating cutter assembly during vertical movement of the floating cutter assembly.

It is still a further object of the invention to provide for use with and in combination with an agricultural combine a floating cutter assembly and an associated gathering reel of the finger or tine type which are so operationally related to each other as to increase the effectiveness and efficiency of the cooperating floating cutter assembly and gathering reel in operating on "down" crops, including greater efficiency in raising up the "down" crops for the cutting operation and in conveying the "down" crops after cutting into the crop inlet opening of the header.

In achievement of these objectives, there is provided in accordance with the invention in an agricultural combine of the type having a header positioned at the forward end of the combine which is adapted to receive a cut crop for threshing, a floating cutter assembly pivotally mounted at the forward end of said header and adapted to floatingly move vertically relative to said header in accordance with variations in the contour of the terrain passed over by said floating cutter assembly and in order to pass over obstacles in the path of said floating cutter assembly, and a gathering reel carried by said header and positioned forwardly of said cutter assembly relative to the forward direction of movement of said combine, the improvement which comprises means for vertically moving said gathering reel relative to said header in closely tracking relation with the vertical movement of said floating cutter assembly whereby to avoid interference between said cutter assembly and said gathering reel during vertical movement of said cutter assembly, comprising means for sensing the vertical position of said floating cutter assembly, motor means operatively connected to said gathering reel for changing the vertical position of said gathering reel relative to said header, and control means responsive to said sensing means for controlling said motor means to change the vertical position of said gathering reel relative to said header in closely tracking relation with changes in the vertical position of said floating cutter assembly.

BRIEF DESCRIPTION OF THE DRAWINGS

Further objects and advantages of the invention will become apparent from the following description taken in conjunction with the accompanying drawings in which.

DETAILED DESCRIPTION OF THE INVENTION

Figure 1:
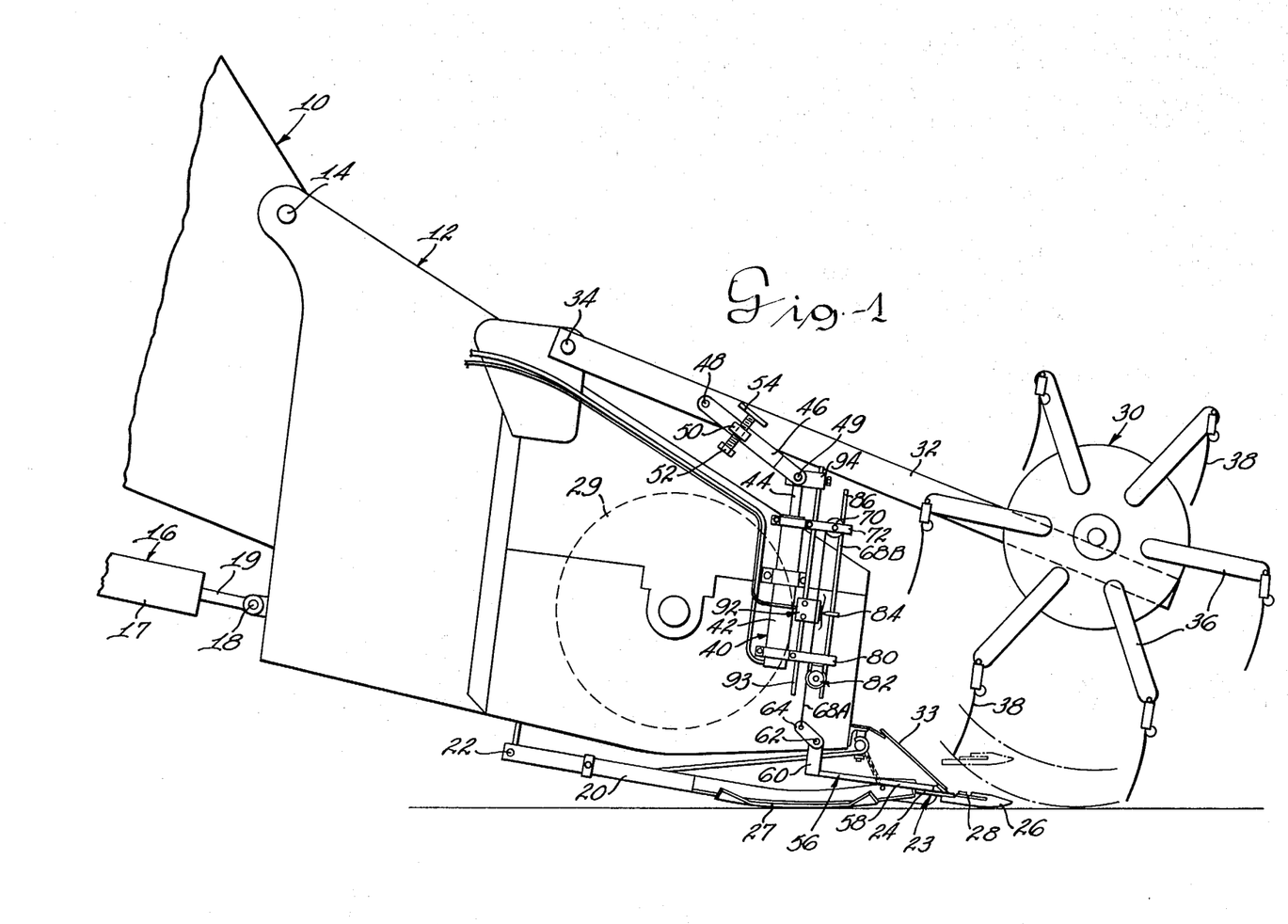
FIG. 1 is a view in side elevation showing the forward end of an agricultural combine and the header of the combine, mounted on said forward end, and further showing the floating cutter assembly and the gathering reel positioned forwardly of the floating cutter assembly, and the control means for effecting vertical movement of the gathering reel in closely tracking relation to the vertical movement of the floating cutter assembly.

Referring now to the drawings and more particularly to FIG. 1, there is shown an agricultural combine generally indicated at 10 having a cut crop receiving apparatus or header generally indicated at 12, pivotally connected at 14 at the upper portion of the header to the forward portion of the combine. The lower portion of header 12 is pivotally connected at point 18 to piston 19 of a hydraulic ram generally indicated at 16, the cylinder 17 of which is suitably anchored to the main structure of combine 12, whereby to permit pivotal swinging movement of header 12 relative to the main structure of the combine 10 about pivot point 14 for purposes of transport and also to permit adjusting the vertical position of header 12 with respect to the main structure of combine 10. Header 12 is adjusted vertically as a function of the vertical position of floating cutter assembly 23, as is shown by the aforementioned U.S. Pat. No. 3,698,164 to Jerry C. Boone et al. This vertical adjustment of header 12 as a function of the vertical position of floating cutter assembly 23 is accomplished by controlling the admission of hydraulic fluid to or alternatively by controlling the exhaust of hydraulic fluid from hydraulic ram 16 to thereby control the angular position of header 12 about the pivotal connection 14 of header 12 to the main structure of combine 10. Since gathering reel 30 is mounted on header 12, vertical adjustment of header 12 as just described provides adjustment of gathering reel 30 in response to vertical movement of floating cutter assembly 23. However, the vertical adjustment of header 12 only occurs after a predetermined vertical movement of floating cutter assembly 23 has occurred, and hence only a coarse adjustment is made in the vertical position of gathering reel 30 in response to a vertical movement of floating cutter assembly 23.

A forwardly extending floating arm 20 which may be one of a plurality of similar support arms is pivotally connected at 22 to header 12. Only one arm 20 is shown in supporting relation to floating cutter assembly 23. However, it will be understood that floating cutter assembly 23 may be supported by a plurality of similar forwardly extending arms 20.

A riding shoe 27 is attached to floating arm 20 near the forward end of arm 20 and rides on the ground surface, following the contour of the ground, thereby causing arm 20 and the cutter assembly 23 carried by arm 20 to pivot about point 22 in response to changes in the ground contour or in response to an obstacle which might be passed over by riding shoe 27. The floating cutter assembly 23 comprises a stationary cutter bar 24 from the forward end of which extend a plurality of stationary sickle guards 26 which are spaced from each other laterally of cutter bar 24. Sickle guards 26 cooperate with a reciprocating sickle 28 to provide a cutting action on the crops which are acted upon by the combine, as is well known in the art.

Header 12 typically might have a transverse dimension extending laterally of the direction of travel of the combine of 24 feet, for example. The floating cutter assembly 23 supported by floating arms 20 extends for substantially the entire transverse width of header 12.

A conveyor auger 29, shown in dotted line in FIG. 1, is mounted inside the forward portion of header 12 and serves to convey laterally toward the threshing area of the combine crops deposited in the forward end of header 12 by gathering reel 30, the cut crops being moved up the shield 33 (which serves as a ramp) by gathering reel 30 and into header 12.

A gathering reel generally indicted at 30 of the tine or finger type is supported forwardly of header 12 by means of reel arms 32 which are pivotally supported at pivot point 34 on header 12. Gathering reel 30 includes a plurality of circumferentially spaced radially extending arms 36 which support contiguous the radially outer ends of the respective arms downwardly depending tines 38. Reel 30 is rotatably driven by suitable drive means (not shown), and during the rotation of reel 30 the tines 38 are caused to follow a predetermined orbital path by suitable mechanism (not shown) as is well known in the art.

Means are provided in accordance with the present invention for adjusting the vertical height of the gathering reel 30 in closely tracking relation with variations in the height of the floating cutter assembly 23 such as might be caused by undulations in the terrain or by obstacles in the path of the floating cutter assembly.

A hydraulic cylinder assembly or ram generally indicated at 40 mounted on the forward portion of header 12 is provided for adjusting the vertical height of reel support arms 32 about the pivotal axis 34 of reel support arms 32 and thus whereby to adjust the vertical height of gathering reel 30. Only one hydraulic cylinder assembly 40 is shown and described. However, a separate hydraulic cylinder assembly 40 may be provided for each reel support arm 32. Hydraulic cylinder assembly 40 comprises a hydraulic cylinder 42 and a piston 43 (FIG. 4) movable within hydraulic cylinder 42. Piston 43 carries a piston rod 44.

The upper end of piston rod 44 is pivotally connected at 49 to the lower end of an adjusting arm 46, the opposite and upper end of adjusting arm 46 being pivotally connected at 48 to reel arm 32. An internally threaded nut member 50 is welded or otherwise rigidly secured to the surface of adjusting arm 46 intermediate the length of adjusting arm 46. A screw member 52 threadedly engages the internally threaded nut member 50 carried by adjusting arm 46.

An abutment 54 is welded or otherwise rigidly attached to the surface of reel support arm 32 in the path of movement of adjusting screw 52. Thus, it will be seen that by rotating screw 52 into engagement with abutment 54, reel support arm 32 may be adjusted upwardly or downwardly as desired about the pivotal support axis 34 of arm 32 whereby to provide a desired adjustment of the height of gathering reel 30 for a given position of piston rod 44 of hydraulic cylinder assembly 40 and for obtaining a desired initial adjustment of the position of the tines 38 of gathering reel 32 relative to floating cutter assembly 23.

The automatic height control means for gathering reel 30 comprises a plurality of sensing members each generally indicated at 56 located in laterally spaced relation to each other along the transverse width of header 12 and at intervals which coincide with the flexibility of cutter bar 24. Each sensing member 56 is of generally L shape and includes a forwardly extending sensing portion 58 to the rearward or left-hand end of which, relative to the view shown in the drawings, is rigidly connected a vertical portion 60. The vertical portion 60 of each respective sensing member 56 is rigidly secured to a rod member 62 which extends for the lateral width of header 12, the opposite ends of rod 62 being suitably supported by bearings carried by the laterally opposite walls of header 12 for angular or pivotal movement of rod 62 about a horizontal axis.

An inclined lever arm or crank member 64 is fixed to rod 62 and extends on the opposite side of the horizontal pivotal axis of rod 62 from the side on which vertical arm portions 60 of the respective sensing members 56 lie.

Figure 2:
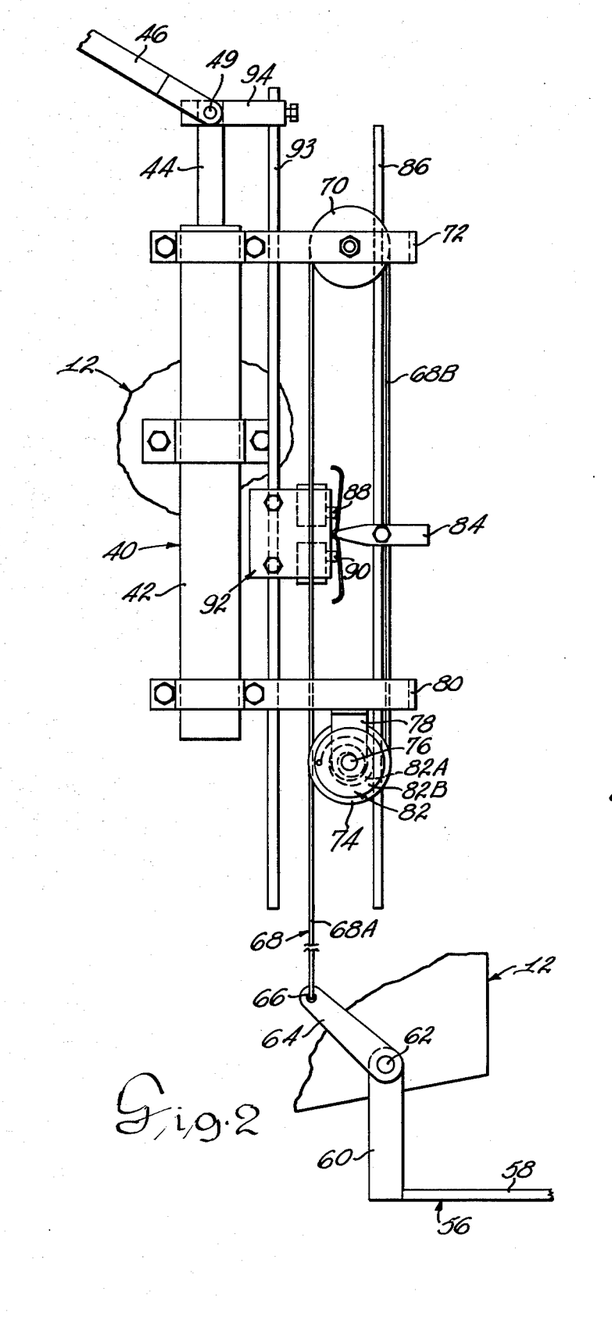
FIG. 2 is a detail view in elevation of the control mechanism which forms part of the automatic height control system for the gathering reel.
Figure 3:
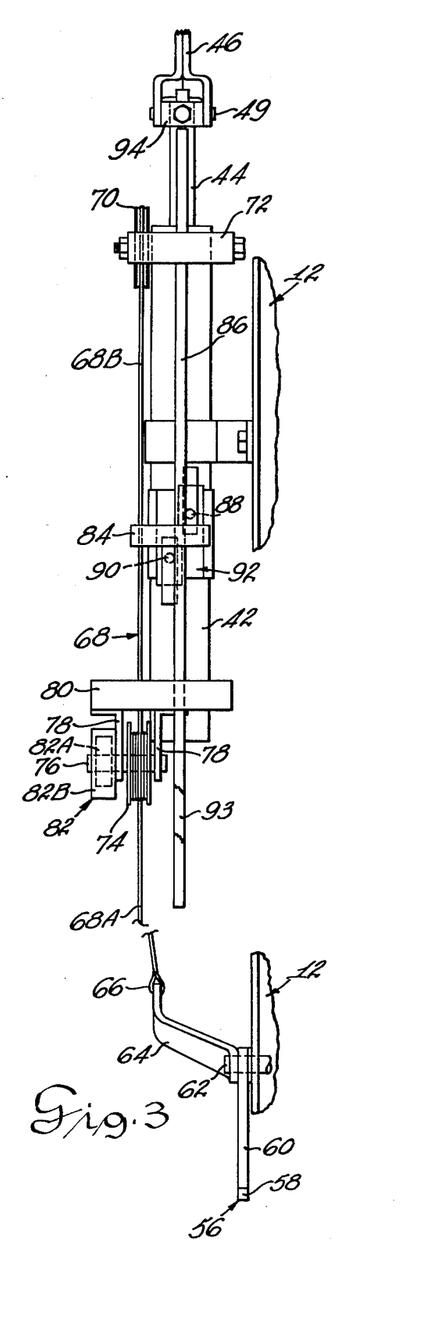
FIG. 3 is an end view of the control mechanism of FIG. 2.

Referring now more particularly to FIGS. 2 and 3 which show details of the control mechanism for the gathering reel height control, it will be noted that the outer end of crank member 64 is pivotally connected at 66 to the lower end of run 68A of steel cable 68 which is trained about a pulley member 70. Pulley member 70 is supported for rotation by a normally horizontal upper support bracket member 72 which in turn is clamped or otherwise secured to the upper end of hydraulic cylinder 42. Cable 68 passes over pulley 70 to define a cable run 68B which extends downwardly on the opposite side of pulley 70 from the cable run 68A. The lower end of cable run 68B is secured to a sheave 74 which is fixed to a horizontal shaft 76. Shaft 76 is supported for rotation by laterally spaced vertically extending arm members 78 which are secured to a lower horizontal support bracket 80 which in turn is clamped or otherwise secured to hydraulic cylinder 42. A recoil spring assembly is generally indicated at 82 and includes a spring 82A and a spring housing 82B. Spring housing 82B is fixed to vertical arm member 78 which, in turn, is secured to horizontal bracket 80. Thus, spring housing 82B is fixed in position relative to hydraulic cylinder 42. One end of recoil spring 82A is secured to rotatable shaft 76, while the other end of spring 82A is secured to spring housing 82B. Recoil spring 82A applies a constant torque to shaft 76 which maintains sufficient tension in cable 68 to take up any slack which may occur in cable 68. Recoil spring 82A also serves to bias sensing member 56 into constant engagement with floating cutter assembly 23. A switch operator member 84 is fixed to and moves with run 68B of cable 68. Switch operator member 84 is also secured to a vertically slidable rod member 86. Rod 86 is guided and supported in its vertical movement by suitable guide passages in upper and lower stationary clamping brackets 72 and 80.

Switch operator 84 cooperates with a "raise" switch 88 and with a "lower" switch 90 which are mounted on a switch housing generally indicated at 92. Switch housing 92 is secured to and moves with a vertical rod 93 which is guided in its vertical movement by guide passages in the upper and lower horizontal brackets 72 and 80. The upper end of vertically movable piston rod 44 which moves in hydraulic cylinder 42 is connected by a cross member 94 to the upper end of vertically slidable rod 93 whereby rod 93 and hence switch housing 92 move up and down in accordance with the vertical movements of piston rod 44.

Figure 4:
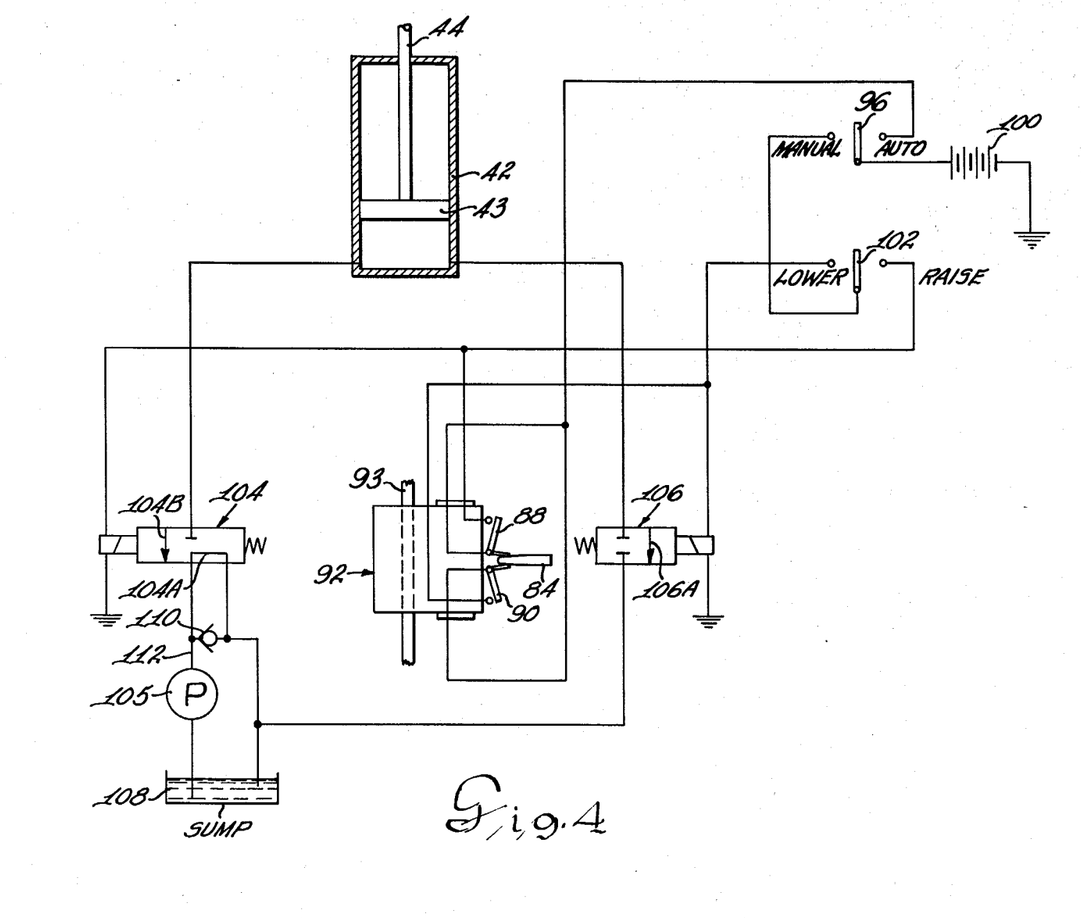
FIG. 4 is a schematic diagram of the hydraulic and electrical circuit arrangement used in the automatic gathering reel height control arrangement of the invention.

In the hydraulic and electrical circuit diagram of FIG. 4, there is shown a first solenoid valve 104 for controlling the admission of hydraulic fluid from continuously operating pump 105 to the interior of hydraulic cylinder 42 beneath piston 43. There is also shown a second solenoid valve 106 which controls the exhaust of hydraulic fluid from hydraulic cylinder 42 beneath piston 43. In FIG. 4, both of the solenoid valves 104 and 106 are shown in their neutral or deenergized position. That is, "raise" solenoid valve 104 is shown in a position in which valve 104 does not hydraulically connect the output of continuously operating pump 105 to the interior of hydraulic cylinder 42, but instead connects the output of pump 105 to sump 108 through passage 104A in valve 104. Also, in FIG. 4, "lower" solenoid valve 106 is shown in a position in which it does not exhaust hydraulic fluid from cylinder 42 through valve passage 106A to sump 108.

A pressure relief valve 110 is connected from output conduit 112 of pump 105 to sump 108 to permit pump 105 to discharge to sump 108 regardless of the position of solenoid valve 104, in the event of an excessive hydraulic pressure condition in pump output line 112.

Referring now to the electrical wiring diagram of FIG. 4, it will be noted that a selector switch 96 is provided which may be selectively switched to either the MANUAL position or to the AUTO position. If selector switch 96 is thrown to the MANUAL position, the electrical power supply indicated at 100 is connected to manual control switch 102 which may be thrown either to the "raise" position to energize solenoid-operated valve 104 to cause the raising of piston 43 in hydraulic cylinder 42, and thus to cause the raising of gathering reel 30 or, alternatively, manual control switch 102 may be thrown to the "lower" position to energize solenoid-operated valve 106 which causes hydraulic pressure to be relieved in hydraulic cylinder 42 to cause the lowering of piston 43 in hydraulic cylinder 42 and thus to cause the lowering of gathering reel 30.

SUMMARY OF AUTOMATIC OPERATION

For automatic control of the height of gathering reel 30 in accordance with variations in the vertical position of floating cutter assembly 23, selector switch 96 is moved to AUTO position.

Assume that as combine 10 moves along the ground surface it encounters an obstacle or encounters a rise in the level of the ground. This obstacle or rise in the ground elevation will cause an upward movement of floating cutter assembly 23 causing sensing element 56 to move upwardly in a counterclockwise direction relative to the views of FIGS. 1 and 2, thereby rotating arm 60, rod 62 and crank member 64 in a counterclockwise direction relative to the views of FIGS. 1 and 2. The counterclockwise rotation of crank 64 pulls cable member 68 in a downward direction over pulley 70, causing a downward movement of cable run 68A and an upward movement of cable run 68B. Upward movement of cable run 68B moves switch operator 84 in an upward direction relative to the view of FIGS. 1 and 2 from its neutral position shown in the view of FIG. 2 in which switch operator 84 is shown in the void space between the two switches 88 and 90, and causes switch operator 84 to engage and close "raise" switch 88, thereby energizing "raise" solenoid valve 104 which permits hydraulic fluid from pump 105 to pass through passage 104B of "raise" solenoid valve 104 and into hydraulic cyinder 42 beneath piston 43. This causes upward movement of piston 43 and piston rod 44 and hence causes an upward movement of reel support arms 32 to raise gathering reel 30.

The same upward movement of piston 43 and piston rod 44 which imparts an upward movement to gathering reel 30 as just described also imparts an upward movement to slidable rod 93 which is connected through cross connecting member 94 to the upper end of piston rod 44, thereby imparting an upward movement to switch housing 92 which is secured to and moves upwardly with slidable rod 93.

Upward movement of switch housing 92 as just described causes "lower" switch 90 which is mounted on and carried by switch housing 92 to move upwardly into engagement with switch operator 84, "raise" switch 88 in the same upward movement of switch housing 92 moving out of engagement with switch operator 84. The engagement of "lower" switch 90 with switch operator 84 closes "lower" switch 88 and results in energization of the "lower" solenoid valve 106 which connects the space in hydraulic cylinder 42 beneath piston 43 to sump 108, thereby relieving hydraulic pressure in cylinder 42 beneath piston 43 and permitting piston 43 to drop, and consequently permitting switch housing 92 which is physically connected to piston rod 44 through connecting member 94 and through vertically slidable rod 93 to lower. The lowering of switch housing 92 as just described moves "lower" switch 90 out of contact with switch operator 84 and causes "raise" switch 88 to again contact switch operator 84, to thereby close "raise" switch 88. During this cycling sequence just described, switch operator 84 remains throughout at a vertical position determined by the vertical level of the floating cutter assembly 23. The cycling sequence in which switch operator 84 is alternately engaged by "lower" switch 90 and by "raise" switch 88 continues until switch housing 92 finally settles at a stabilized or equilibrium position at which switch operator 84 is located in the void space between the "raise" and "lower" switches 88 and 90, respectively, carried by switch housing 92.

The sequence of events which occurred when floating cutter assembly 23 moved upwardly due to encountering a rise in the ground level or an obstacle, as just described, is substantially reversed when floating cutter assembly 23 passes over the obstacle and drops to the next highest obstacle or level.

When floating cutter assembly 23 passes over the obstacle and drops down to the next highest level, this causes crank member 64 to rotate in a clockwise direction with respect to the views of FIGS. 1 and 2, thereby relieving the tension on cable 68 and permitting recoil spring 82A to pull downwardly onto run 68B of cable 68 to thereby cause the winding of cable 68 onto sheave 74. Since switch operator 84 is secured to cable run 68B, the downward movement of cable run 68B causes switch operator 84 to engage and close "lower" switch 90, thereby energizing "lower" solenoid valve 106 to exhaust some hydraulic fluid from beneath piston 43 in hydraulic cylinder 42 to sump 108, thereby causing downward movement of piston 43 and of piston rod 44, to thereby lower lift arms 32 and gathering reel 30 carried by lift arms 32. The downward movement of piston 43 and piston rod 44 as just described will also lower switch housing 92 due to the connection between piston rod 44 and the vertically slidable rod 93 on which switch housing 92 is mounted. The downward movement of switch housing 92 causes "raise" switch 88 to engage and be closed by switch operator 84, causing energization of "raise" solenoid valve 104 to thereby admit fluid to hydraulic cylinder 42 beneath piston 43. This cycle of alternately closing first "lower" switch 90 and then "raise" switch 88 as just described will continue until switch housing 92 finally reaches a position of stabilization or equilibrium in which switch housing 92 is so positioned relative to switch operator 84 that switch operator 84 is positioned in the void space between "lower" switch 90 and "raise" switch 88 or; alternatively, until another vertical movement of floating cutter assembly 23 transmits a mechanical movement to the system to initiate a new repositioning cycle for gathering reel 30.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In an agricultural combine of the type having a header positioned at the forward end of the combine which is adapted to receive a cut crop for threshing, a floating cutter assembly pivotally mounted at the forward end of said header and adapted to floatingly move vertically relative to said header in accordance with variations in the contour of the terrain passed over by said cutter assembly and in order to pass over obstacles in the path of said cutter assembly, and a gathering reel carried by said header and positioned forwardly of said cutter assembly relative to the forward direction of movement of said combine and having an optimum vertical position relative to said cutter assembly, the improvement which comprises means for vertically moving said gathering reel relative to said header in closely tracking relation with the vertical movement of said cutter assembly whereby to avoid interference between said cutter assembly and said gathering reel during vertical movement of said cutter assembly, comprising sensing means for sensing the vertical position of said cutter assembly relative to said header, motor means operatively connected to said gathering reel for changing the vertical position of said gathering reel relative to said header, and control means responsive to said sensing means for controlling said motor means to change the vertical position of said gathering reel relative to said header in closely tracking relation with changes in the vertical position of said cutter assembly, said control means including mechanical follow-up means for stopping operation of said motor means when said gathering reel has been restored to said optimum vertical position relative to said cutter assembly.

2. The combination defined in claim 1 in which said motor means is a hydraulic ram operatively connected to said gathering reel for changing the vertical position of said gathering reel relative to said header, said control means comprising hydraulic circuitry operatively associated with said hydraulic ram, valve means in said hydraulic circuitry, and means for controlling the position of said valve means in accordance with the vertical position of said cutter assembly relative to said header as sensed by said sensing means, whereby to selectively admit hydraulic fluid to or exhaust hydraulic fluid from said hydraulic ram and thus whereby to control the vertical height of said gathering reel relative to said header in closely tracking relation with the vertical movement of said cutter assembly.

3. The combination defined in claim 1 in which said gathering reel is of the tine type.

4. The combination defined in claim 1 in which said sensing means comprises a sensing portion adapted to bear against said floating cutter assembly and to follow the vertical movement of said cutter assembly, and spring means biasing said sensing portion into constant engagement with said cutter assembly.

5. The combination defined in claim 2 in which said valve means comprises a first and a second electrically operated solenoid valve for respectively controlling the raising and the lowering of said hydraulic ram, each of said solenoid valves being connected in a corresponding electrical circuit, a corresponding switch means in the electrical circuit of each solenoid valve, a switch operating means movable to selectively close the switch means in the electrical circuit of one or the other of said electrical solenoids, mechanical linkage means connecting said sensing means to said switch operating means, whereby movement of said sensing means in response to vertical movement of said cutter assembly relative to said header is effective to move said switch operating means to energize one or the other of said solenoid valves to control the vertical height of said hydraulic ram and thus whereby to control the vertical height of said gathering reel relative to said header in closely tracking relation with the vertical movement of said cutter assembly.

6. In combination, a floating cutter assembly adapted to be pivotally supported by the header of an agricultural combine, said cutter assembly being adapted to floatingly move vertically relative to the header in accordance with variations in the contour of the terrain passed over by said cutter assembly and in order to pass over obstacles in the path of said cutter assembly, a gathering reel adapted to be carried by said header and to be positioned forwardly of said cutter assembly relative to the forward direction of movement of said combine and having an optimum vertical position relative to said cutter assembly, the improvement which comprises means for vertically moving said gathering reel relative to said header in closely tracking relation with the vertical movement of said cutter assembly whereby to avoid interference between said cutter assembly and said gathering reel during vertical movement of said cutter assembly, sensing means for sensing the vertical position of said cutter assembly relative to said header, motor means operatively connected to said gathering reel for changing the vertical position of said gathering reel relative to the header, and control means responsive to said sensing means for controlling said motor means to change the vertical position of said gathering reel relative to the header in closely tracking relation with changes in the vertical position of said cutter assembly, said control means including mechanical follow-up means for stopping operation of said motor means when said gathering reel has been restored to said optimum vertical position relative to said cutter assembly.

7. The combination defined in claim 6 in which said motor means is an hydraulic ram operatively connected to said gathering reel for changing the vertical position of said gathering reel relative to the header, said control means comprising hydraulic circuitry operatively associated with said hydraulic ram, valve means in said hydraulic circuitry, and means for controlling the position of said valve means in accordance with the vertical position of said cutter assembly relative to said header as sensed by said sensing means whereby to selectively admit hydraulic fluid to or exhaust hydraulic fluid from said hydraulic ram and thus whereby to control the vertical height of said gathering reel relative to the header in closely tracking relation with the vertical movement of said cutter assembly.

8. The combination defined in claim 6 in which said gathering reel is of the tine type.

9. The combination defined in claim 6 in which said sensing means comprises a sensing portion adapted to bear against said floating cutter assembly and to follow the vertical movement of said cutter assembly, and spring means biasing said sensing portion into constant engagement with said cutter assembly.

10. The combination defined in claim 7 in which said valve means comprises a first and a second electrically operated solenoid valve for respectivly controlling the raising and the lowering of said hydraulic ram, each of said solenoid valves being connected in a corresponding electrical circuit, a corresponding switch means in the electrical circuit of each solenoid valve, a switch operating means movable to selectively close the switch means in the electrical circuit of one or the other of said electrical solenoids, mechanical linkage means connecting said sensing means to said switch operating means, whereby movement of said sensing means in response to vertical movement of said cutter assembly relative to said header is effective to move said switch operating means to energize one or the other of said solenoid valves to control the vertical height of said hydraulic ram and thus whereby to control the vertical height of said gathering reel relative to the header in closely tracking relation with the vertical movement of said cutter assembly.

11. In an agricultural combine of the type having a header positioned at the forward end of the combine which is adapted to receive a cut crop for threshing, a floating cutter assembly pivotally mounted at the forward end of said header and adapted to floatingly move vertically relative to said header in accordance with variations in the contour of the terrain passed over by said cutter assembly and in order to pass over obstacles in the path of said cutter assembly, and a gathering reel carried by said header and positioned forwardly of said cutter assembly relative to the forward direction of movement of said combine and having an optimum vertical position relative to said cutter assembly, and in which said combine includes means for adjusting the height of said header in response to a predetermined vertical movement of said floating cutter assembly relative to said header whereby to correspondingly adjust the vertical height of said gathering reel which moves vertically with said header, the improvement which comprises means for vertically moving said gathering reel relative to said header in closely tracking relation with the vertical movement of said floating cutter assembly and in response to a vertical movement of said floating cutter assembly relative to said header which is less than said predetermined vertical movement, whereby to avoid interference between said cutter assembly and said gathering reel during vertical movement of said cutter assembly, said improvement further comprising sensing means for sensing the vertical position of said cutter assembly relative to said header, motor means operatively connected to said gathering reel for changing the vertical position of said gathering reel relative to said header, and control means responsive to said sensing means for controlling said motor means to change the vertical position of said gathering reel relative to said header in closely tracking relation with changes in the vertical position of said cutter assembly, said control means including mechanical follow-up means for stopping operation of said motor means when said gathering reel has been restored to said optimum vertical position relative to said cutter assembly.

12. The combination defined in claim 11 in which said motor means is a hydraulic ram operatively connected to said gathering reel for changing the vertical position of said gathering reel relative to said header, said control means comprising hydraulic circuitry operatively associated with said hydraulic ram, valve means in said hydraulic circuitry, and means for controlling the position of said valve means in accordance with the vertical position of said cutter assembly relative to said header as sensed by said sensing means whereby to selectively admit hydraulic fluid to or exhaust hydraulic fluid from said hydraulic ram and thus whereby to control the vertical height of said gathering reel relative to said header in closely tracking relation with the vertical movement of said cutter assembly.

13. The combination defined in claim 11 in which said gathering reel is of the tine type.

14. The combination defined in claim 11 in which said sensing means comprises a sensing portion adapted to bear against said floating cutter assembly and to follow the vertical movement of said cutter assembly, and spring means biasing said sensing portion into constant engagement with said cutter assembly.

15. The combination defined in claim 12 in which said valve means comprises a first and a second electrically operated solenoid valve for respectively controlling the raising and the lowering of said hydraulic ram, each of said solenoid valves being connected in a corresponding electrical circuit, a corresponding switch means in the electrical circuit of each solenoid valve, a switch operating means movable to selectively close the switch means in the electrical circuit of one or the other of said electrical solenoids, mechanical linkage means connecting said sensing means to said switch operating means, whereby movement of said sensing means in response to vertical movement of said cutter assembly relative to said header is effective to move said switch operating means to energize one or the other of said solenoid valves to control the vertical height of said hydraulic ram and thus whereby to control the vertical height of said gathering reel relative to said header in closely tracking relation with the vertical movement of said cutter assembly.

* * * * *